J. F. O'CONNOR.
FRICTION SHOCK ABSORBING MECHANISM.
APPLICATION FILED JUNE 9, 1917.
1,254,262. Patented Jan. 22, 1918.
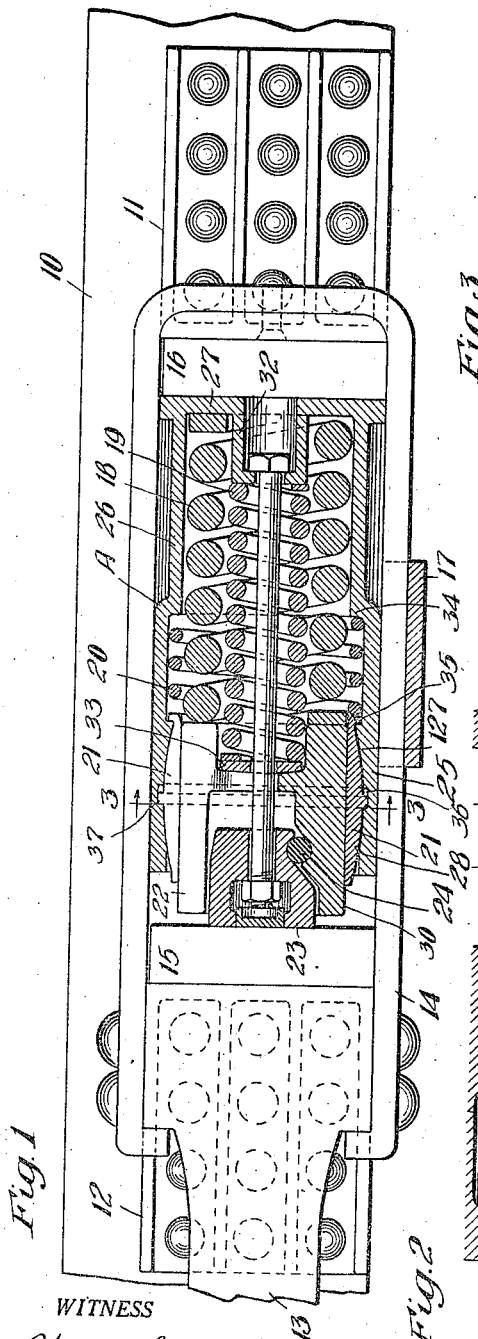
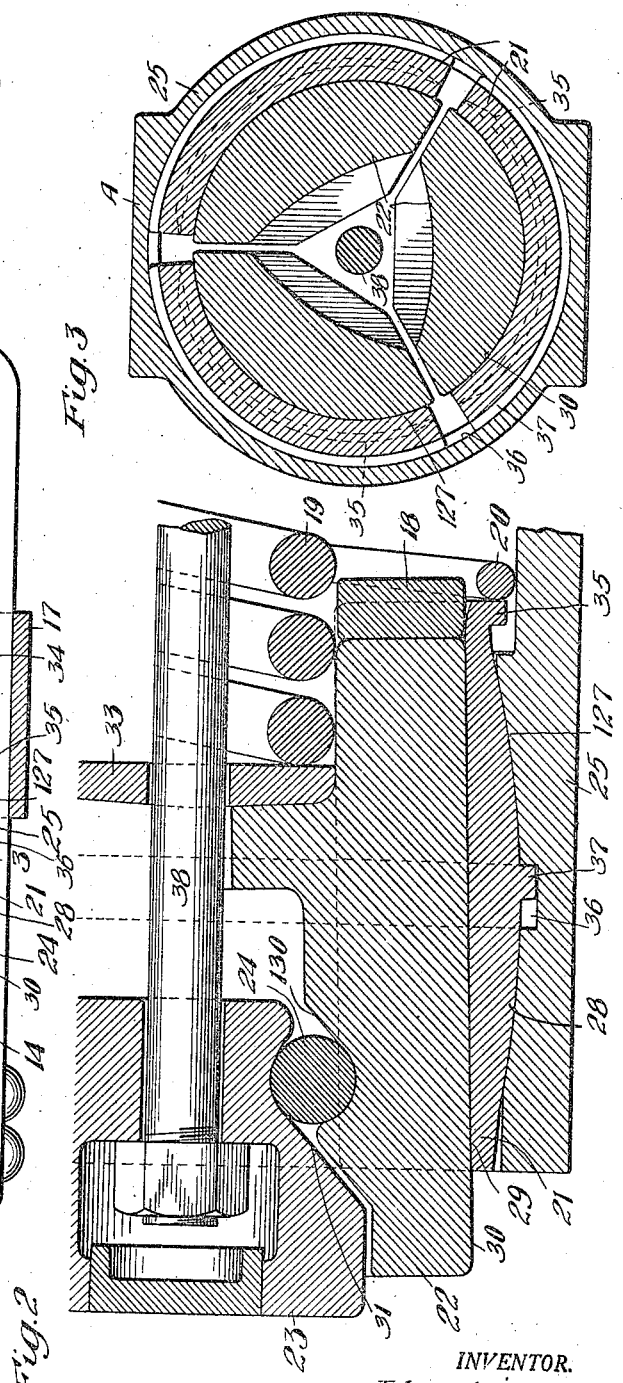
WITNESS
Wm. Geiger
INVENTOR.
John F. O'Connor
BY Geo. I. Haight
ATTORNEY

@# UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,254,262.

Specification of Letters Patent.

Patented Jan. 22, 1918.

Application filed June 9, 1917. Serial No. 173,856.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism having high capacity and certain release, the mechanism being more particularly adapted for friction gears of railway draft riggings.

Another and more specific object of the invention is to provide a mechanism of the type above indicated wherein certain elements are employed to produce the effect of a tapered friction cylinder to thereby increase capacity and facilitate release of the friction elements.

In the drawing forming a part of this specification, Figure 1 is a part elevational view, part vertical longitudinal section of a portion of a draft rigging showing my improvements in connection therewith, the parts being shown in normal or full release position. Fig. 2 is an enlarged detail sectional view illustrating more particularly the relative arrangement of the friction elements and showing the same in closed or full compression position. And Fig. 3 is a transverse, sectional view, taken substantially on the line 3—3 of Fig. 1 illustrating the friction gear proper.

In said drawing, the shock absorbing mechanism is shown as applied to a railway car having center sills 10, rear stops 11, front stops 12, draw bar 13, yoke 14, front follower 15 and rear follower 16, all assembled in the usual manner. The parts are supported by a saddle plate 17 attached to the sills.

The improved shock absorbing mechanism is shown in the form of a friction gear interposed between the followers 15 and 16. As shown, the friction gear comprises a casting A, main springs 18 and 19, release spring 20, friction elements 21, friction shoes 22, wedge 23 and anti-friction rollers 24.

The casting A comprises a friction shell proper 25 at its open or forward end and a spring casing 26 to the rear thereof, the casing 26 having an integral rear wall 27 that bears directly on the follower 16. The shell 25 is of cylindrical form and in addition to the curvature of its inner wall resulting from the cylindrical form, the inner surface is curved longitudinally with arcuate surfaces, as indicated at 127. Each of the friction elements 21, which correspond in number to the number of friction shoes, has its exterior surface similarly curved, as indicated at 28, to correspond to the curvature of the inner surface of the cylinder. The inner surface of each friction element 21 is a true cylindrical surface, as indicated at 29, that is, any longitudinal section therethrough will show a straight line, as indicated most clearly in Figs. 1 and 2. The friction shoes 22 are of a well known form, the same having exterior cylindrical surfaces 30 co-acting with the surfaces 29, each shoe 22 being provided on its inner face with an inclined wedging surface 130 on which rolls the corresponding anti-friction roller 24. The wedge element 23 is provided with a series of wedge faces 31, the number corresponding to the number of friction shoes, and on which roll the anti-friction rollers 24.

The main spring which comprises the coils 18 and 19, bears at its rear end against the rear wall 27 and boss 32 and at its forward end against the rear ends of the shoes and the washer 33. The release spring 20 bears at its rear end against an internal annular shoulder 34 formed on the interior of the casting A and at its forward end against the rear flanged edges 35 of the elements 21. It will also be noted that the shell 25 is provided with an annular recess or groove 36 on its interior in which move flanges 37 formed on the exterior of the elements 21.

The normal position of the parts is as shown in Fig. 1 in which position they are maintained by a bolt 38. In this normal position, it will be noted that the inner surfaces 29 of the elements 21 extend parallel to the axis of the gear and the flanges 37 are in their outermost position bearing against the outer shoulder provided by the grooves 36, the elements 21 being maintained in this position by the spring 20. Upon compression of the gear, inward movement of the wedge 23 forces the friction shoes 22 inwardly against the action of the spring coils 18 and 19. As this movement continues, there is a tendency for the elements 21 to move inwardly also and as the latter move in this direction, it is obvious that the co-operating curved bearing surfaces 127 and 28 of the shell and elements 21, will cause the elements 21 to tilt so that the inner surfaces 29 thereof gradually decrease the angle between their surfaces 29 and the axis of the gear. In other words, the shape of the surfaces normally provided by the friction elements 21 changes from a true cylinder to that of a tapered cylinder. The limit of inward or tilting movement of the friction elements 21 is determined by engagement of the flanges 37 with the inner shoulder provided by the recess 36, which condition is illustrated in Fig. 2. Due to the above described action, it is apparent that the resistance to the inward movement of the friction shoes will gradually increase as the taper of the cylinder increases. Upon release, the shoes will be easily forced outwardly due to the tapered cylinder within which they are confined and as the friction shoes approach their outermost position, the friction elements 21 or segments, will also be gradually returned to normal position under the action of the release spring 20.

With the arrangement above described, it is apparent that the shock absorbing mechanism will develop a high capacity which can be varied as desired by changing the permissible degree of inclination of the friction elements 21 with respect to the axis of the gear and a certain release is obtained at all times.

I claim:

1. In a friction shock absorbing mechanism, the combination with a shell, friction shoes, wedging means, and a spring, of movable friction elements interposed between the shoes and shell, the friction surfaces of said elements which co-act with the friction shoes, being adapted to change their inclination with respect to the line of movement of the shoes as the latter are forced inwardly of the shell.

2. In a friction shock absorbing mechanism, the combination with a shell, friction shoes, wedging means, and a spring, of movable friction elements interposed between the shoes and shell, the outer surfaces of said elements and the inner surfaces of said shell being correspondingly curved in a direction longitudinally of the shell to thereby permit said friction elements to vary their position with respect to the line of movement of the friction shoes.

3. In a friction shock absorbing mechanism, the combination with a cylinder, a plurality of friction shoes within the cylinder, a wedge co-acting with said shoes, and a spring for resisting movement of the shoes, of a plurality of friction elements interposed between the friction shoes and said shell, the number of said elements corresponding to the number of shoes, said shoes and elements having co-acting true cylindrical surfaces, said friction elements being shiftable longitudinally of the shell upon actuation of the mechanism.

4. In a friction shock absorbing mechanism, the combination with a cylinder, a series of circularly arranged friction shoes, a wedge co-acting with said shoes, and spring means for resisting movement of the shoes, of a circularly arranged series of segmental friction elements interposed between the shoes and the shell, said elements and shell having co-acting surfaces curved in a direction longitudinally of the cylinder and said segmental friction elements being shiftable upon actuation of the mechanism to thereby vary the inclination of the inner surfaces of said segmental friction elements with respect to the axis of the cylinder.

5. In a device of the character described, the combination with a casting comprising a shell portion and a spring casing, the shell portion having the inner surface thereof curved in a direction longitudinally of the shell, of a main resisting spring mounted within the spring casing, a plurality of friction elements having exterior curved surfaces bearing agianst said inner curved surfaces of the shell, said elements being shiftable with respect to the shell, a spring co-acting directly with said elements to return the latter to normal position after each actuation, friction shoes mounted on the interior of said elements and co-acting therewith, said shoes being resisted by said main spring, and wedging means co-acting with said shoes.

In witness that I claim the foregoing I have hereunto subscribed my name this 21st day of May, 1917.

JOHN F. O'CONNOR.